United States Patent [19]

Singer et al.

[11] 4,270,333
[45] Jun. 2, 1981

[54] SECURITY SCREEN

[75] Inventors: Richard M. Singer, Lafayette, Calif.; Charles H. Seidl, Kane, Pa.

[73] Assignee: Kane Manufacturing Corporation, Kane, Pa.

[21] Appl. No.: 136,942

[22] Filed: Apr. 3, 1980

Related U.S. Application Data

[62] Division of Ser. No. 19,344, Mar. 12, 1979, Pat. No. 4,221,038.

[51] Int. Cl.³ .................... B23P 15/12; E04C 2/38
[52] U.S. Cl. ................................. 52/818; 52/817
[58] Field of Search ............... 52/815, 817, 818, 819, 52/820; 160/371

[56] References Cited

U.S. PATENT DOCUMENTS

| | | | |
|---|---|---|---|
| 1,540,788 | 6/1925 | McClure | 52/818 |
| 1,772,156 | 8/1930 | Meadows | 29/462 X |
| 1,810,748 | 6/1931 | Berger | 29/160 X |
| 2,006,755 | 7/1935 | Whitlock | 52/818 |
| 2,111,448 | 3/1938 | Hoffman | 52/818 |
| 2,139,423 | 12/1938 | Scheeler | 29/160 X |
| 3,554,383 | 1/1971 | Ball | 52/817 |

Primary Examiner—Alfred C. Perham

[57] ABSTRACT

A security screen formed from an elongate strip of formable material and an interlacing of wire rods is disclosed. The side edges of an elongate strip are initially notched and slotted in one edge; thereafter the strip is deformed along four parallel lines which become the interior corners of frame members having a substantially rectangular cross section. A pair of complementary corner notches, each formed of a particular shape, allow the strip to be folded or deformed transversely of its length dimension, thereby forming a pair of intersecting frame members, each having a substantially rectangular cross section defined by a front wall, parallel inside and outside side walls and a pair of flanges. The inside flange and side wall of each frame member provide a plurality of slotted openings spaced equal distances apart to receive the ends of steel rods which are interlaced and form a wire meshed screen.

3 Claims, 5 Drawing Figures

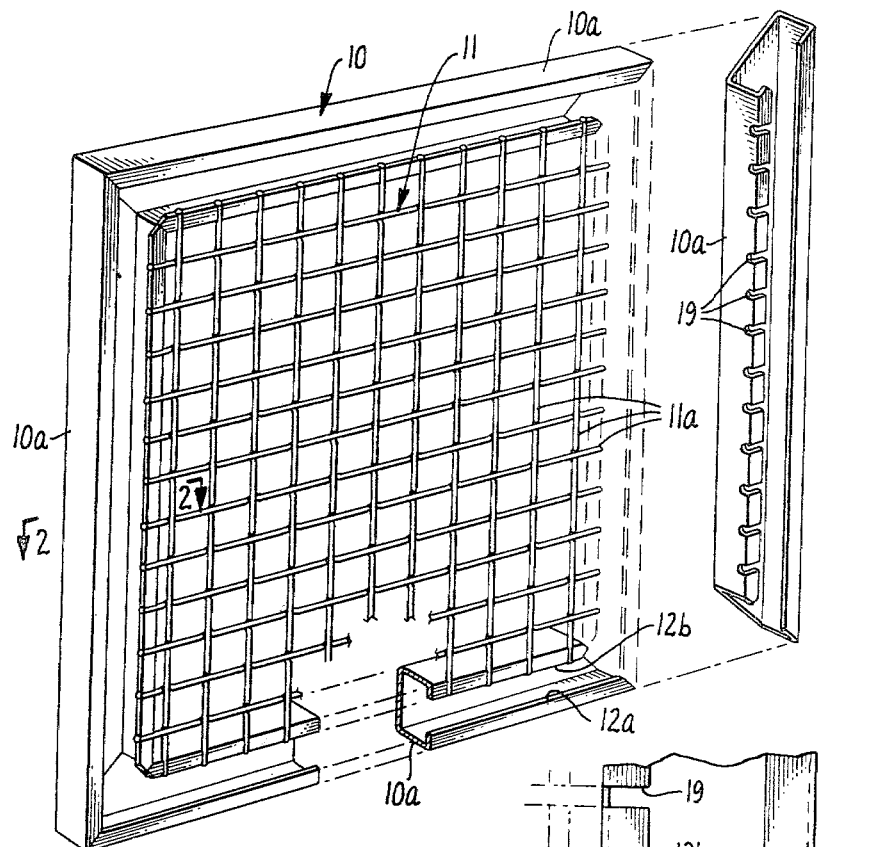
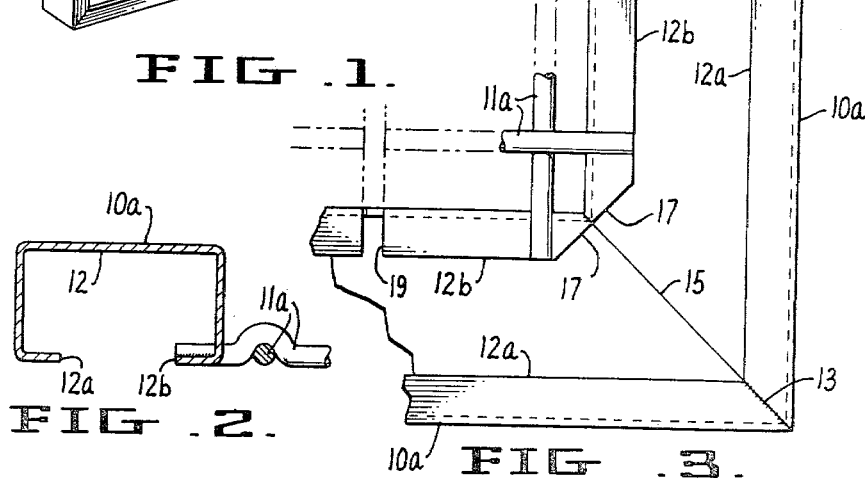

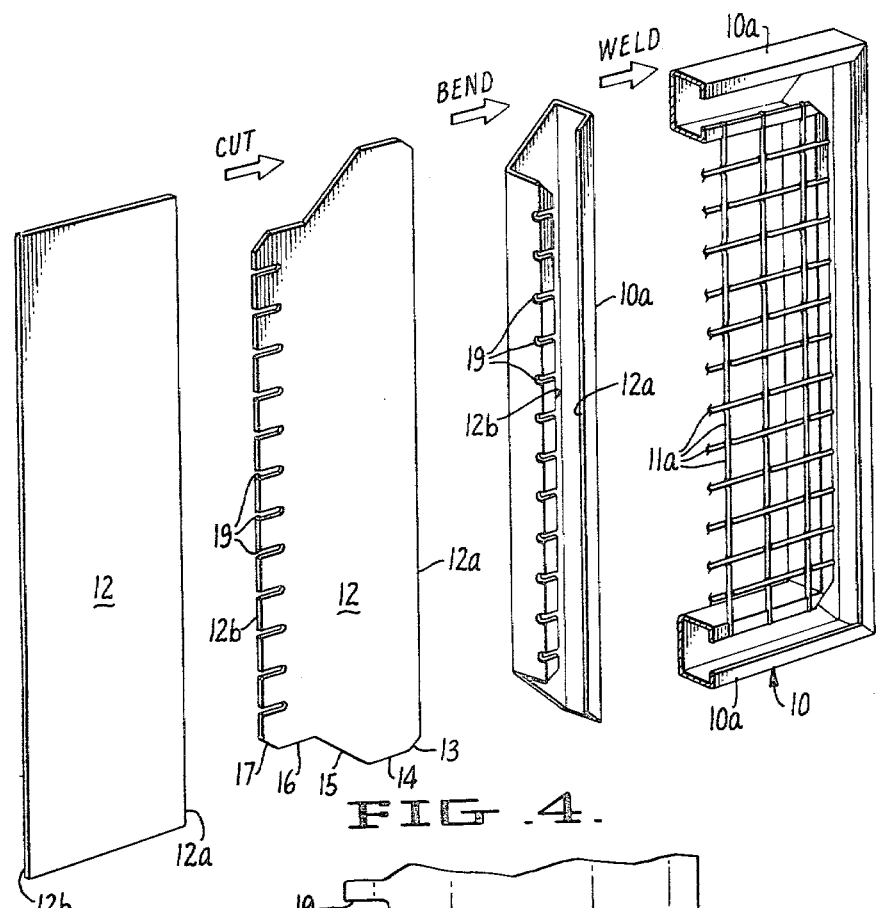
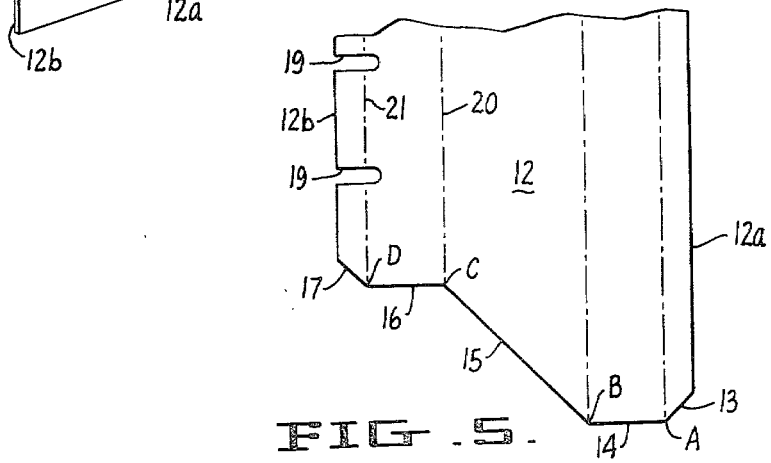

SECURITY SCREEN

This is a division of application Ser. No. 19,344, filed Mar. 12, 1979, now U.S. Pat. No. 4,221,038.

This invention relates generally to screen products and to the manufacture thereof. More particularly, the screen products contemplated by the invention are made of high strength materials allowing the products to be used as barriers for holding cells, drunk tanks, prisons and other security enclosures.

Not unlike the present invention, screen products normally comprise a frame and screening. However, the present invention contemplates using a screening material of much greater weight than customarily found and as a consequence, the existing processes and methods of assembly of a screen to a frame are not practical. In that regard, it is to be understood that most screen products are assembled to a frame by either clamping the screen material between surfaces of the frame or bending the screen material into recesses formed in the frame. However, the size and rigidity of the rods which make up screen material used in connection with the present invention prohibit such methods or make them impractical. A new and different method must, therefore, be devised. It is to that end that the present invention is directed.

In brief, screen products formed in accordance with this invention utilize elongated strips of formable material which are sequentially shaped, slotted and formed into frame members. Those members are then joined end to end, forming a rectangular frame having exposed slots for receiving the ends of the rods which are interlaced and form a square mesh screen.

In the drawings forming a part of this application and in which like parts are identified by like reference numerals, FIG. 1 is a perspective view of a preferred embodiment of the invention in a screen product comprising a frame and screen;

FIG. 2 is a section taken on lines 2—2 of FIG. 1;

FIG. 3 is an enlarged detail illustrating one corner of the frame;

FIG. 4 illustrates the method by which the frame is formed from elongate strips of formable material; and FIG. 5 is a plan view of one end of an elongated strip utilized in the manufacture of the frame.

Referring to FIG. 1, the screen product shown comprises a rectangular frame 10 and a square mesh screen 11 formed by an interlacing of rods 11a. A typical screen may be formed with ¼" or ⅜" diameter steel rods woven in a mesh 2"×2". Each side 10a of frame 10 is formed from an elongated strip of formable material, such as 12 gauge steel.

Referring to FIGS. 2, 3, 4 and 5, the invention more particularly comprises a method by which each side or frame member 10a is manufactured and adapted for receiving the ends of rods 11a. FIGS. 4 and 5 illustrate an elongated strip 12 having parallel side edges 12a and 12b. Both ends of strip 12 are uniquely shaped or cut to provide edges defined by a continuous line of straight segments joined end to end at angular offsets of approximately 45°. A first segment 13 begins at side edge 12a of the strip and extends at an angular offset of 45° relative to said edge; a second segment 14 connects to the end of the first segment at point A and extends at an angular offset of 45° relative to the line of the first and being substantially perpendicular to the first side edge 12a of the strip; a third segment 15 connects to the end of the second segment at point B, joined thereto at an angular offset of 45° and being substantially perpendicular to the first segment; a fourth segment 16 connects to the end of the third segment at point C, again at an angular offset of 45° and being substantially perpendicular to side edge 12a and parallel to the second segment 14; a fifth segment 17 connect to the end of the fourth segment at point D with an angular offset of 45° relative to both segment 16 and edge 12b. The cutting or shaping of the strips in the manner described is of importance in providing frame members of a substantially rectangular cross section which may be connected end to end and form rectangular frame 10.

While each elongated strip 12 remains in a substantially planar condition, a plurality of slots 19 are formed in side edge 12b of each strip. Each slot extends into the region between a pair of parallel imaginary lines 20 and 21 (shown as broken lines) passing through points C and D, respectively, and parallel to side edge 12b.

In a preferred method of manufacture, the root of each slot matches the peripheral shape of rods 11a; the width of each slot is substantially equal to the diameter of the steel rods which form the screen; and the extension of each slot between the pair of imaginary lines approximates or is substantially equal to the diameter of the steel rods. Further, slots 19 are spaced equal distances apart on centers equal to the square mesh center-to-center distance between the rods of the screen.

After slots 19 have been formed in strips 12, the strips are next deformed or longitudinally bent along four lines parallel to the side edges. One line of deformation extends through point A; a second line extends through point B; and the third and fourth lines are the imaginary lines 20 and 21 which extend through points C and D. Each deformation or folding of the strip produces a substantially right angle bend resulting in a rectangular frame member having a front wall, parallel inner and outer side walls and a pair of flanges, as best shown in FIGS. 2 and 4. It will be evident that one side wall and its connected flange are slotted, and the ends of each frame member define a 45° cleavage connectable with the ends of other frame members at substantially right angles. Four such frame members are then assembled end to end, the slotted side wall and connected flange being on the inside; and the frame members are connected, as by welding, to form the rectangular frame. Thereafter, the screen of wire rods 11a is assembled to the frame, the ends of the rods being received in the slots of each frame member. The screen is then secured to the frame by welding a plurality of the wire rods to the inner flange or side wall of each frame member. It is preferred, however, that both ends of each rod be welded to frame members. The elongated opening between opposed inner and outer flanges of each frame member provides the necessary access for welding the frame members together, and each weldment produced thereby is entirely concealed within the frame. A cover strip (not shown) is then placed over each of the elongate openings between flanges and secured to the frame member as with screws or by welding.

Although a preferred embodiment of the invention has been illustrated and described, various modifications and changes may be resorted to without departing from the spirit of the invention or the scope of the appended claims, and each of such modifications and changes is contemplated.

What is claimed is:

1. A screen product comprising:

a rectangular frame formed with parallel upper and parallel lower side members, each side member having a substantially rectangular cross section defined by a front wall, parallel inner and outer side walls and a pair of flanges, each flange extending inwardly from one side wall toward the other flange and being substantially parallel to said front wall, said pair of flanges defining an opening therebetween, the inner side wall and one flange connected thereto being formed with a plurality of slots spaced equal distances apart along the side member; and an interlacing of wire rods, said rods being interlaced on a center-to-center distance equal to the spacing between slots formed in the inner side walls and connected flanges of said side members.

2. The screen product of claim 1, the width and depth of each slot formed in the inner side walls of each side member being substantially equal to the diameter of the steel rods forming said screen.

3. The screen product of claim 1 and further including a plurality of weldments securing the ends of the steel rods forming said screen to said side members.

* * * * *